US007808774B2

(12) United States Patent
Tay et al.

(10) Patent No.: US 7,808,774 B2
(45) Date of Patent: Oct. 5, 2010

(54) COUPLING POINT TEMPERATURE AND CURRENT MEASURING SYSTEM

(76) Inventors: Boon Hou Tay, 10, Haig Lane, Singapore 438814 (SG); Zengjun Li, No. 4-403, 10 Building, No. 8 Xiatun Road, Fengtai District, Beijing (CN)

( * ) Notice: Subject to any disclaimer, the term of this patent is extended or adjusted under 35 U.S.C. 154(b) by 666 days.

(21) Appl. No.: 11/512,098

(22) Filed: Aug. 30, 2006

(65) Prior Publication Data

US 2008/0068212 A1 Mar. 20, 2008

(51) Int. Cl.
*H02B 1/00* (2006.01)

(52) U.S. Cl. ....................... 361/600; 702/130; 702/183; 702/185

(58) Field of Classification Search ................. 361/600; 702/130, 183, 185
See application file for complete search history.

(56) References Cited

U.S. PATENT DOCUMENTS

| | | | | | |
|---|---|---|---|---|---|
| 4,384,289 | A | * | 5/1983 | Stillwell et al. | 340/870.17 |
| 5,563,799 | A | * | 10/1996 | Brehmer et al. | 702/186 |
| 5,583,492 | A | * | 12/1996 | Nakanishi et al. | 340/870.02 |
| 6,144,569 | A | * | 11/2000 | Rodriguez et al. | 363/49 |
| 6,167,525 | A | * | 12/2000 | Donazzi et al. | 361/93.8 |
| 6,504,268 | B1 | * | 1/2003 | Flegel | 307/85 |
| 7,031,854 | B2 | * | 4/2006 | Lin et al. | 702/60 |
| 7,282,944 | B2 | * | 10/2007 | Gunn et al. | 324/771 |
| 7,337,080 | B2 | * | 2/2008 | Doig et al. | 702/60 |
| 7,430,932 | B2 | * | 10/2008 | Mekhanoshin et al. | 73/865.9 |
| 2005/0143961 | A1 | * | 6/2005 | Lin et al. | 702/190 |
| 2005/0235355 | A1 | * | 10/2005 | Dybsetter et al. | 726/22 |
| 2005/0288876 | A1 | * | 12/2005 | Doig et al. | 702/60 |
| 2006/0017821 | A1 | * | 1/2006 | Garvey et al. | 348/231.3 |
| 2006/0292710 | A1 | * | 12/2006 | Golner et al. | 438/14 |
| 2007/0116403 | A1 | * | 5/2007 | Blemel | 385/12 |
| 2009/0046415 | A1 | * | 2/2009 | Rasmussen et al. | 361/644 |

* cited by examiner

*Primary Examiner*—Timothy Edwards, Jr.
(74) *Attorney, Agent, or Firm*—Muncy, Geissler, Olds & Lowe, PLLC

(57) ABSTRACT

A system for measuring temperature and current at coupling points in an electric distribution network. A monitor device is connected to a series of measuring devices using radio waves. The monitor device sequentially interrogates measuring devices to determine the temperature and current of each one. The measuring devices include a core surrounding the conductor which provides power by induction to each measuring device and also provides a measure of the current. A temperature sensor connected to the core provides the temperature measurement.

37 Claims, 12 Drawing Sheets

COUPLING POINT TEMPERATURE AND CURRENT MEASURING SYSTEM

BACKGROUND OF THE INVENTION

1. Field of the Invention

The present invention relates generally to a remote measuring system and more particularly to a system for measuring temperature and current at a remote point in the electrical distribution network.

2. Discussion of the Background

When electricity is produced at a central power plant, it is then transmitted to various consumers by way of step up transformers, tielines (interconnecting lines between two power systems), transmission lines, step down transformers, sub-transmission lines, high voltage primary distribution feeders and distribution transformers, and low voltage transmission lines. In the course of forming the network, it is necessary to have coupling points at a number of locations in order to link various parts of the network. These allow for simpler installation and connections to various parts of the electrical distribution system. However, resistance is present at each such coupling point. If the coupling point is not secured properly, the resistance at the coupling point will increase. This results in an increase of heat also. If the heat generated is greater than the power rating of the coupling point, it is possible for the coupling point to burn open and be damaged. Thus, the temperature of the coupling point is an indication that an insecure joint is present at the coupling point.

Further, it is important to separate the conductors from each other and other items in order to prevent any flow of electricity from the conductors to ground cables, circuit breakers and other lines. In order to prevent this, the various parts are supported or suspended on insulators. When a higher voltage is carried by a conductor, the thickness of the insulator needed to support it must also increase. It is likewise necessary to keep a minimum distance between the conductors and any other items in order to prevent an electrical discharge. For example, a transmission line carrying 10 Kv requires a minimum gap of 125 mm from the line to any cabinet that houses it. Otherwise an electrical discharge in the form of a spark can occur which results in a voltage collapse in the transmission system and a blackout in the network. Such a minimum gap must also be included between the various power lines due to the different phases of electrical power.

In view of this, it is desirable to include measurement equipment to determine if the temperature of various joints has increased and the current being carried by the conductors is appropriate. However, in a facility such as a power plant or substation, it is not feasible to install the necessary sensors since the use of conducting wires can be the cause of electrical discharge within the cabinet. The use of optical temperatures sensors or infrared temperature meters using optical fibers is also not justifiable. Unfortunately, the use of such optical equipment requires a battery and accordingly requires a replacement when batteries are used up. Further, fiber optics are brittle in nature and can easily be damaged. In addition, any device used must be able to withstand a very high operation voltage. As a result, optical devices are not preferred. Although a power trip can be detected by a Supervisory Control and Data Acquisition (SCADA) system installed in the power plant, the SCADA system cannot locate which coupling point causes the trip.

Accordingly, the need to have sensors for temperature and current at a coupling point is clear and yet existing systems have deficiencies, which are not desirable. These gaps between two sets of power lines or power lines and solid structures such as cabinet walls are very small. Such gaps are reduced further by power lines that are supported by additional insulators. Existing optical systems require batteries, or are brittle and have other problems. Further, it would be desirable to have a system which can remotely detect temperature and current at coupling points in an electrical network and which is easier to operate.

SUMMARY OF THE INVENTION

The present invention overcomes these difficulties and provides a system for remote measurement of temperature and current at coupling points in an electrical network.

The present invention further provides a remote temperature and current measuring device requiring no batteries.

The present invention further provides a temperature and current sensor which is inductively coupled to a power line to provide its own current source.

The present invention still further provides a remote sensor having a temperature sensor and a current measuring device.

The present invention still further provides a remote sensor including a current measuring device and a temperature measuring device which are controlled by circuitry which can transmit and receive the measurement information.

The present invention still further provides a remote temperature and current measuring device that takes the shape of the power line that it surrounds.

The present invention further provides a monitoring device, which can interrogate and receive information from measuring devices so as to accumulate the current measurement data remotely.

The present invention still further provides an electrical distribution network having a plurality of measuring devices for measuring both temperature and current data which can be interrogated by a remote monitoring system in order to accumulate said data.

The present invention provides a system having a monitoring unit with a display which can transmit and receive information from a plurality of remote measuring devices placed at coupling points in an electrical distribution network, each of which determines current and temperature at the coupling point.

The present invention provides a system having a monitoring unit that can forward its received data through a communication interface by standard communication means such as phone lines, broadband, internet or GSM lines.

BRIEF DESCRIPTION OF THE DRAWINGS

A more complete description of the invention and many of the attendant advantages thereof will be readily obtained as the same becomes better understood by the following detailed description when considered in connection with the accompany drawings, wherein.

DESCRIPTION OF PREFERRED EMBODIMENTS

Figure 1:
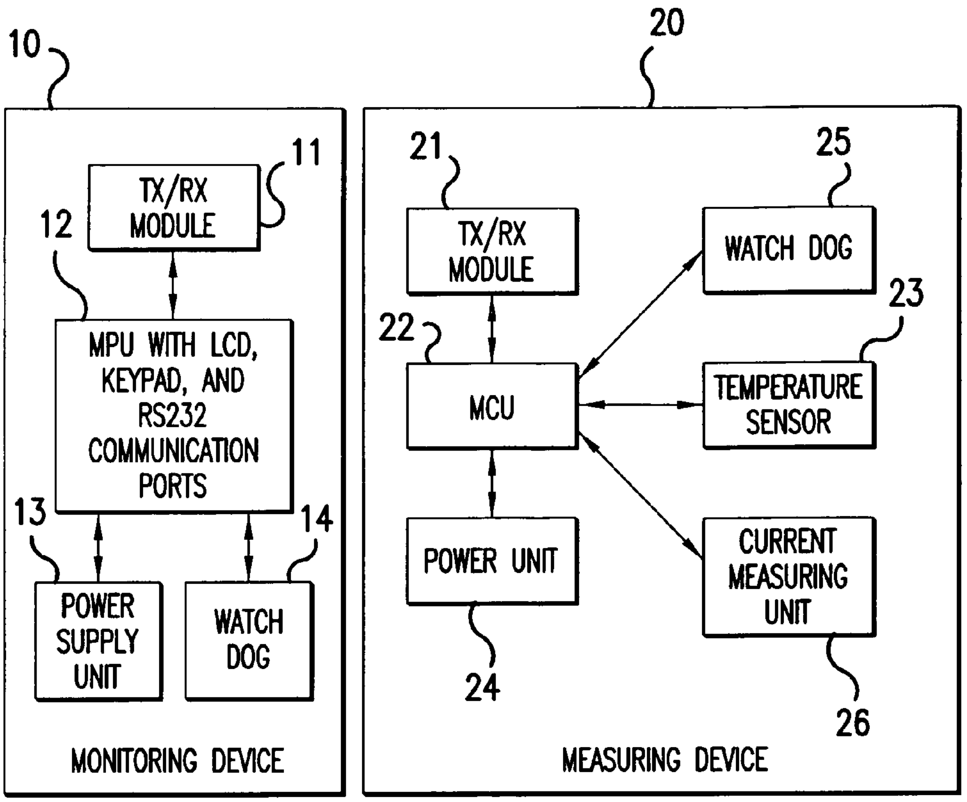
FIG. 1 is a block diagram of the present invention.

Referring now to the drawings, wherein like reference numerals designate identical or corresponding parts throughout several views and more particularly to FIG. 1, wherein the measuring system according to the present invention includes monitoring device 10 and measuring device 20. While only one measuring device is shown, in reality a number of such measuring devices are typically used with a single monitoring device, with one measuring device at each coupling point. The measuring devices may be used in an electrical transmission network, or at various coupling points within a plant or any other system where the temperature and current measurements are important.

Figure 2:
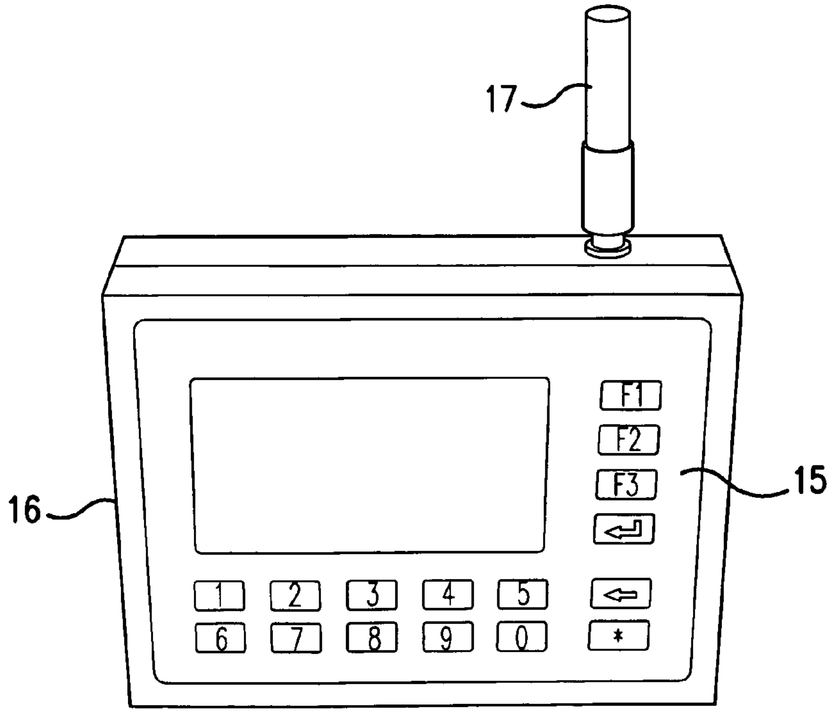
FIG. 2 is a perspective view of the monitoring device according to the present invention.

The monitoring device 10 includes a microprocessor unit 12, which is the main controller for the monitoring device. The main processor unit is connected to a keypad, a liquid crystal display panel and various communication ports. A power supply unit, which may be a battery unit, or a traditional plug in unit, or both, provides power to the monitoring device. A watchdog circuit 14 triggers the main processing unit to restart and re-initialize itself whenever the main unit is not able to reset the timer of the watchdog chip within a set amount or time, or when the program fails. The main processing unit is also connected to the transmission and reception module 11. When the monitoring device wishes to receive data from a measuring device, the transmission and reception module 11 is utilized to send a message to the measuring device indicating that data is requested. As seen in FIG. 2, the transmission and reception module includes an RF antenna on the outside of the case of the monitoring device. FIG. 2 also shows the various buttons of the keypad 15, the LCD panel 16, and the RF antenna 17. This monitoring device has two communication ports (not shown) which supports either RS-232C or RS-485 communication protocol. One of the RS232 ports is used to input the control sequence. The other can be used to forward its received data through a communication interface by standard communication means such as phone lines, broadband, internet, or GSM lines.

Each measuring device 20 likewise contains a number of separate components. A micro-controlling unit 22 controls the entire measuring device including the transmission and reception of messages from the monitoring device. A transmission reception module 21 is connected to the main controller unit for transmitting and receiving messages from the monitoring device. Module 11 in the monitoring device and module 21 in the measuring device are coupled by radio waves so as to transmit and receive message there-between. The measuring device also includes a watchdog circuit 25 which re-starts and re-initializes the main unit should the voltage become too low or the program fails, or whenever the main unit is not able to reset the timer of the watchdog chip within a set amount of time. Temperature sensor 23 detects the temperature of the coupling point and provides data to the main controller unit. This temperature sensor is also seen in FIGS. 3 and 4 and may be in physical contact with the insulation surrounding the junction point to detect the temperature of the device.

The power unit 24 provides power to the controller unit and other units of the measuring device. The power unit contains a core which surrounds the power line. The power is extracted from the power line based on electromagnetic induction principles. Thus, the alternating current in the power line induces an AC current within the unit. The current thus obtained is used to power the entire measuring device. At the same time, the current measuring unit 26 senses the current which is induced, in order to provide a measurement of the current. In operation, the main controller unit receives data from the temperature sensor and current measuring unit and stores various data over time. It can also compute the peak-to-peak, root mean square and effective other values which can be reported to the monitoring device when interrogated.

Figure 3:
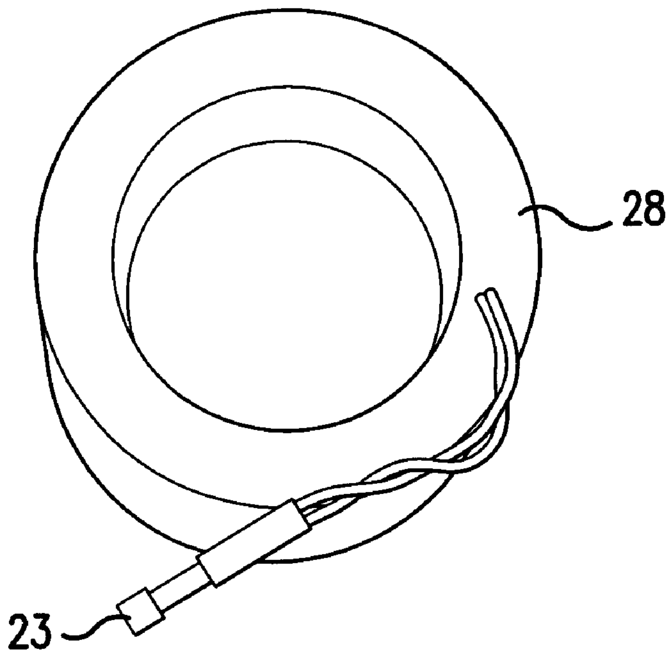
FIGS. 3 and 4 show a top view and a perspective view of the remote measuring device according to the present invention.
Figure 4:
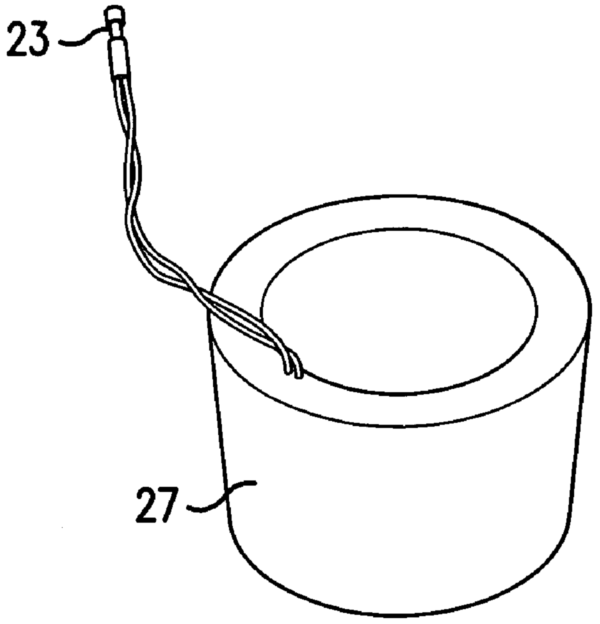

FIG. 3 shows the measuring device including the temperature sensor 23 which extends outwardly from the core 28. Likewise, FIG. 4 shows a perspective view of the same device. The RF antenna 27 may also be included within a torroid formed by the core. The circuitry of the measuring device may also be included within this package so as to make a simple and compact device.

While the core 28 is shown as a solid torroid, it can also be in the form of a split torroid with a hinge on one side and a fastener on the other. This will allow for easy installation over an existing power line without having to disconnect the power line to feed it through the center of the torroid. At the hinge point and the connection point, it is necessary for good contact to be made between the coils on each side of the torroid. Good contact must also be ensured between the split ends of ferrite (or iron) materials, used to concentrate magnetic flux for the coil that uses electromagnetic induction to generate electrical power for the split torroid.

Figure 11:
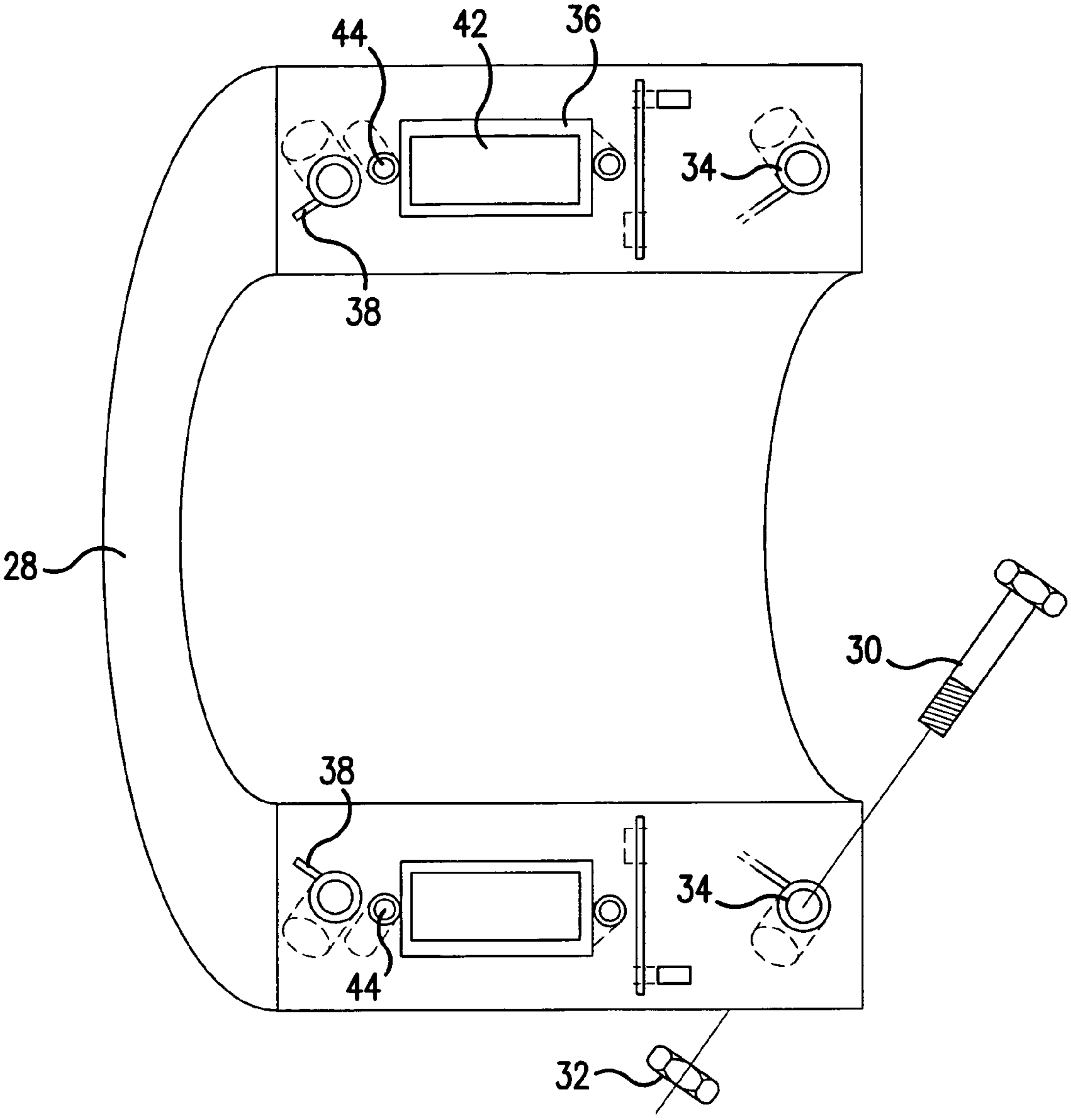
FIG. 11 is a schematic view of the second embodiment of the invention.
Figure 12:
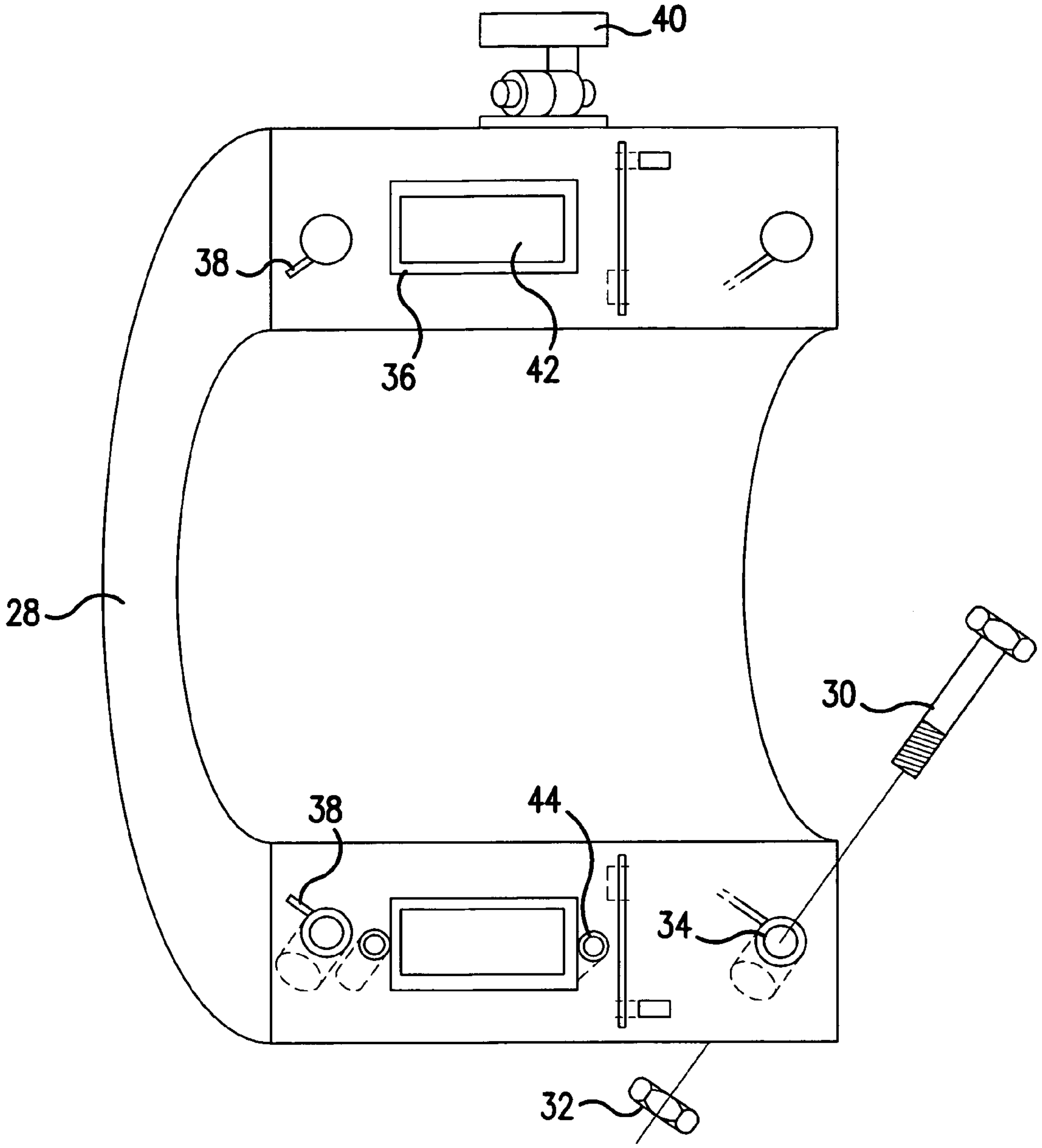
FIG. 12 is a schematic view of the third embodiment of the invention.

Thus, while in use, at least three variations of the core are possible. It is possible to have a solid torroid for the core if the conductor that is being surrounded is disconnectable so that the conductor can be inserted through the solid measuring device. A second possibility (see FIG. 11) is that the core is split into two halves and joined using a pair of nuts 30 and bolts 32 made of copper or other electrical conducting material which extends through both half cores. Upon securing the two half-cores, the exposed end of bolt and that of nut must be covered and insulated by insulating studs (not shown) inserted into the passage that houses the bolt and nut. For the conductor of the core and for any other connecting wires, it is possible to provide contacts 36, 34, 38 on each half core so that when assembled the contacts opposed to each other can provide complete connections. In a third possibility (see FIG. 12), the two half cores are hinged by an insulating hinge 40 and held in place by a fastener at the other joint. The contacts are provided on both half cores in a similar fashion to that in the second arrangement.

Furthermore, these two figures show an area 42 within a contact 36 which is the end of the magnetic core and which should also have good contact. Conducting sleeves 44 are also provided on opposite sides of the magnetic core in order to tighten the two halves of the core together. This is in the form of a conducting sleeve in the same fashion as sleeve 34. Note that in FIG. 12, the end which is hinged does not require such a tightening effort since the hinge automatically places the two halves together.

In forming the core, the entire device, including the antenna are placed inside a mold. Insulating materials are then poured into the mold so that the entire device is immersed. When the material hardens, the measuring device is complete.

While the core has been described as having a single conductor, it is possible that any number of turns can be used. Fewer turns are needed for cables used in high power transmission compared to cables with lower power transmission, due to the varying intensity of the magnetic field generator from within the power cable. The general rule is to have enough coils so that a steady DC power can be generated to power the circuitry used in the core.

Figure 5:
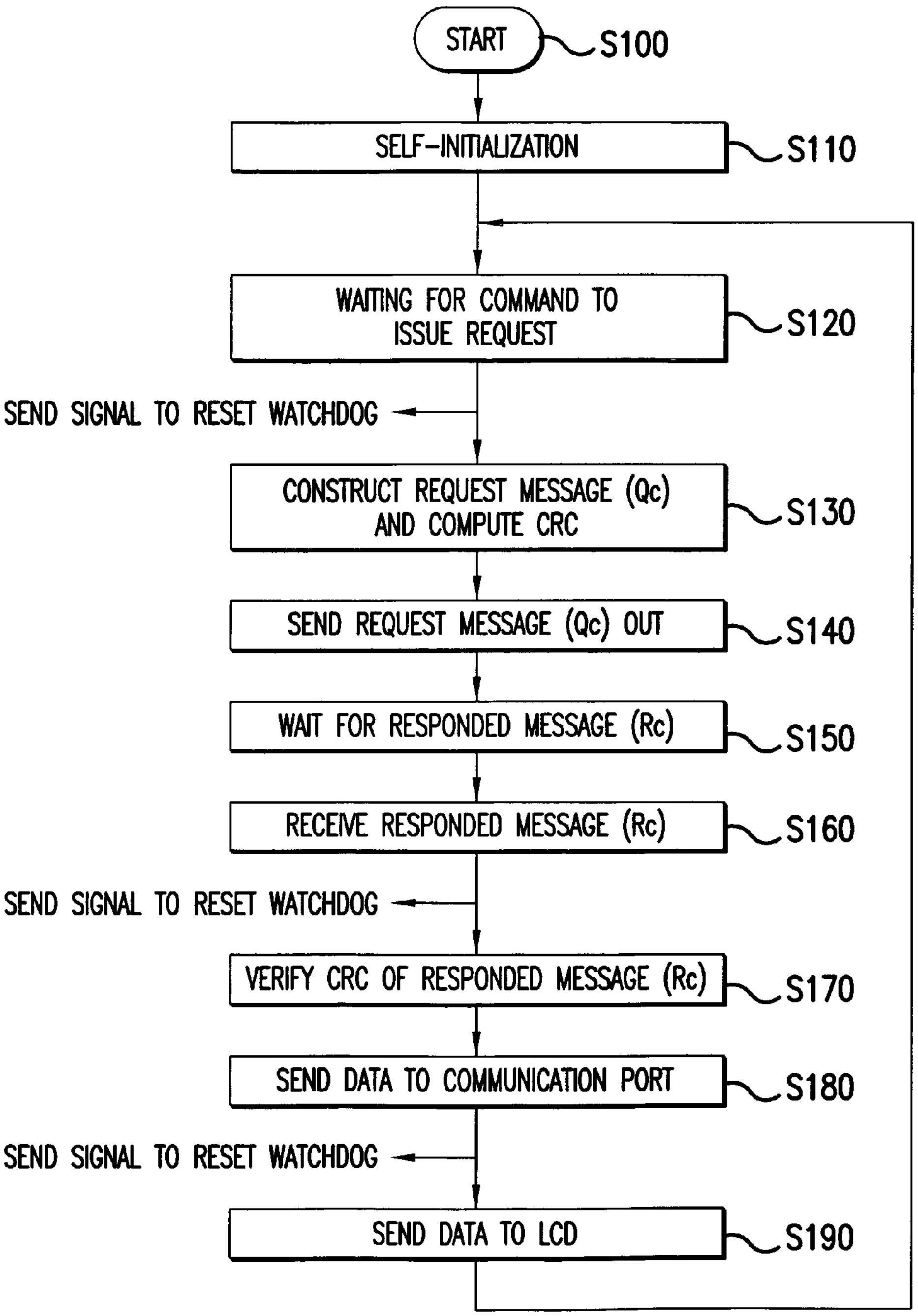
FIG. 5 is a flow chart showing the operation of the monitoring unit.

FIG. 5 shows a flow chart of the operation of the microprocessing unit 12 of the monitoring device. Upon power up, in step S100 the MPU performs an initialization in step 110. Upon receiving an issuing command, it produces a request message (Qc) in step S130. The identity of the particular measuring device is included in the header of the request message. The message also includes a cyclic redundancy check (CRC) in the trailer. At the same time that the request message is being instructed, a signal is sent to reset the watchdog. The request message is sent in step S140 and the monitoring device waits for a response (Rc) in step S150. When the message is received in step S160 a re-set signal is sent to the watchdog. The responded message is also examined to verify the cyclic redundancy check. The received data is then sent to the communication port in step 180 and the watch dog again reset. It is also displayed in step S190. At that point the monitoring device returns to wait for a new command.

Figure 6:
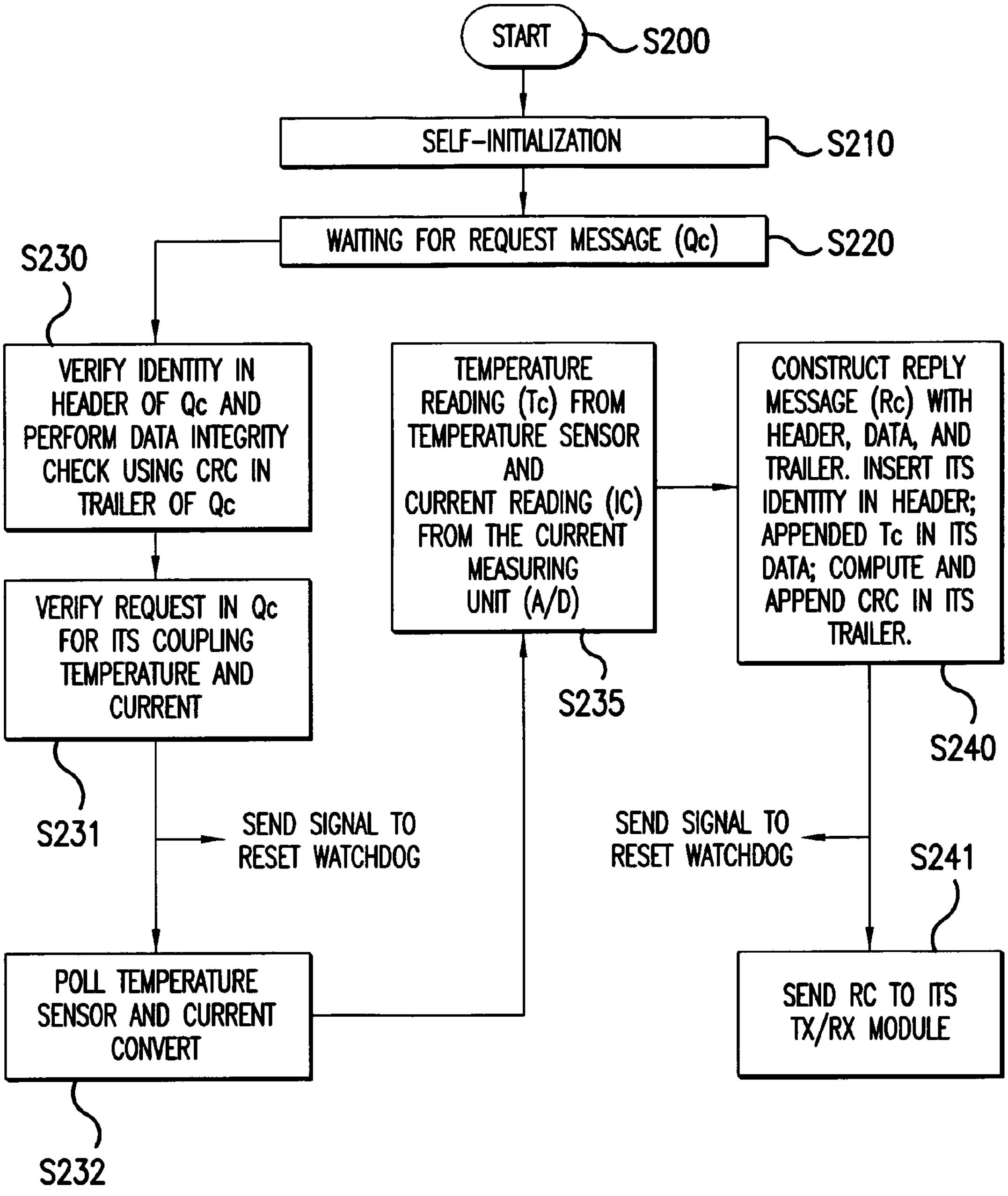
FIG. 6 is a flow chart of the operation of the measuring device.

FIG. 6 shows a flow chart for the measuring device. Upon power up in step S200, the controller unit performs an initialization in step S210 and waits for a request message (Qc) in step S220. Upon reception of an incoming request message, the header of the message is used to verify the identity and an integrity check is performed by using the CRC in the trailer of the message in step S230. The request and instruction is verified in step S231 and a re-set signal is sent to the watchdog. The temperature sensor is then polled along with the current measuring unit in order to determine this data. The temperature and current readings are then sent to the MCU (step S235) and used to construct the reply message Rc. The identity of the measuring device is placed in the header and temperature and current readings are place in the data section and the computed CRC is computed in the trailer. This is all accomplished in step S240 and a re-set signal is sent to the watchdog chip at the end of the step. In step S241, the signal is sent by the transmission reception module to the monitoring device.

Figure 7:
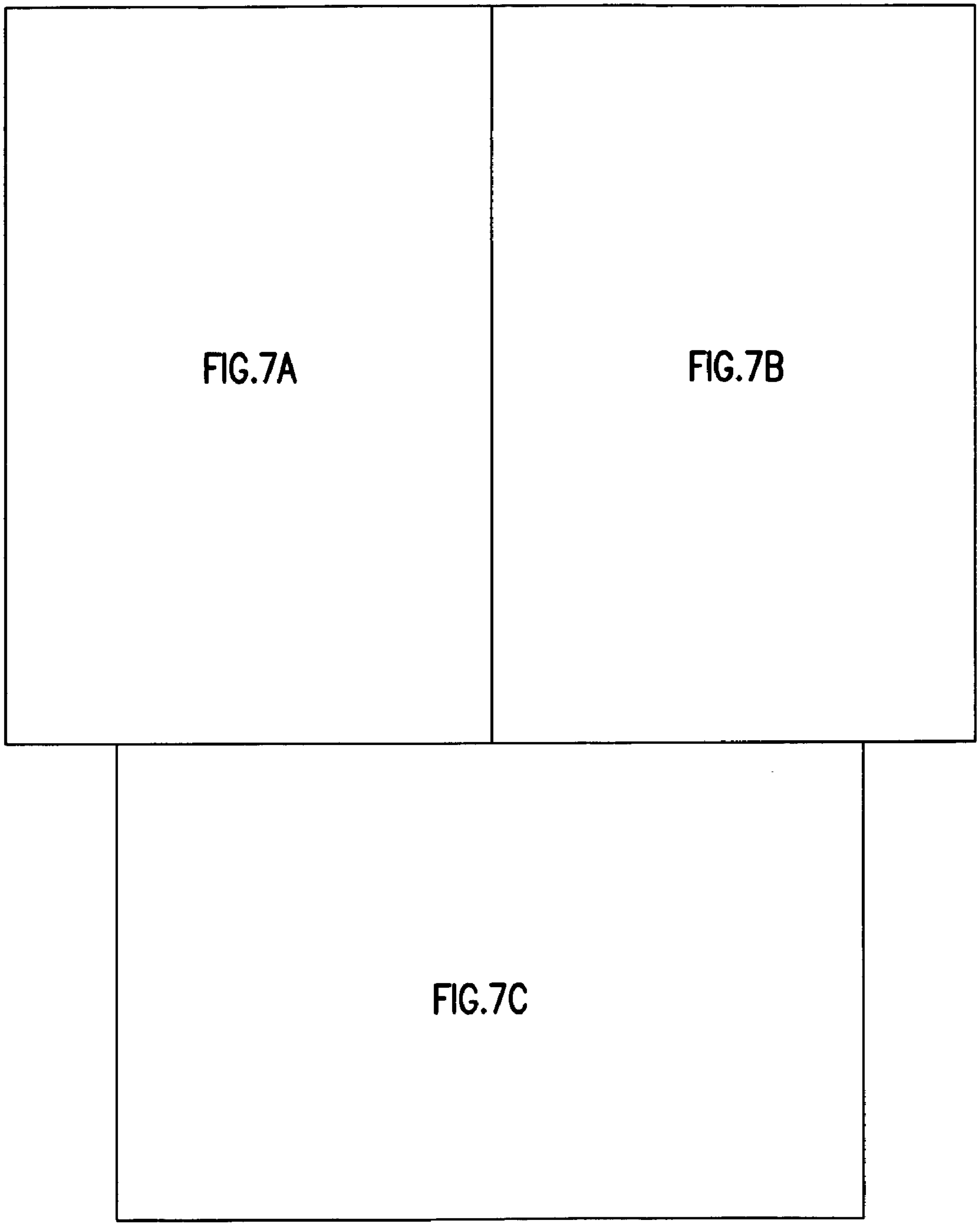
FIG. 7 is a schematic of the monitoring device of the present application.
Figure 7A:
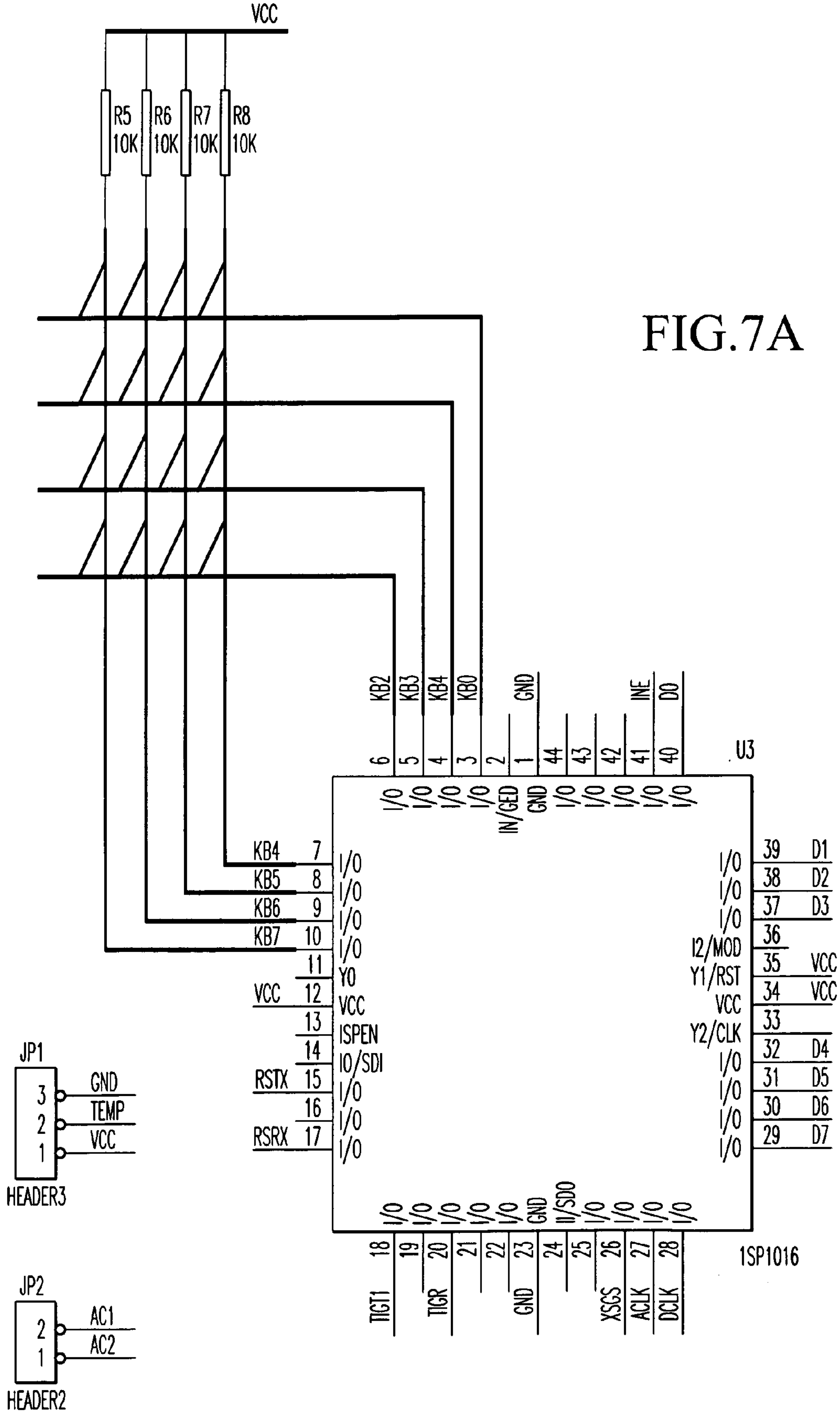
Figure 7B:
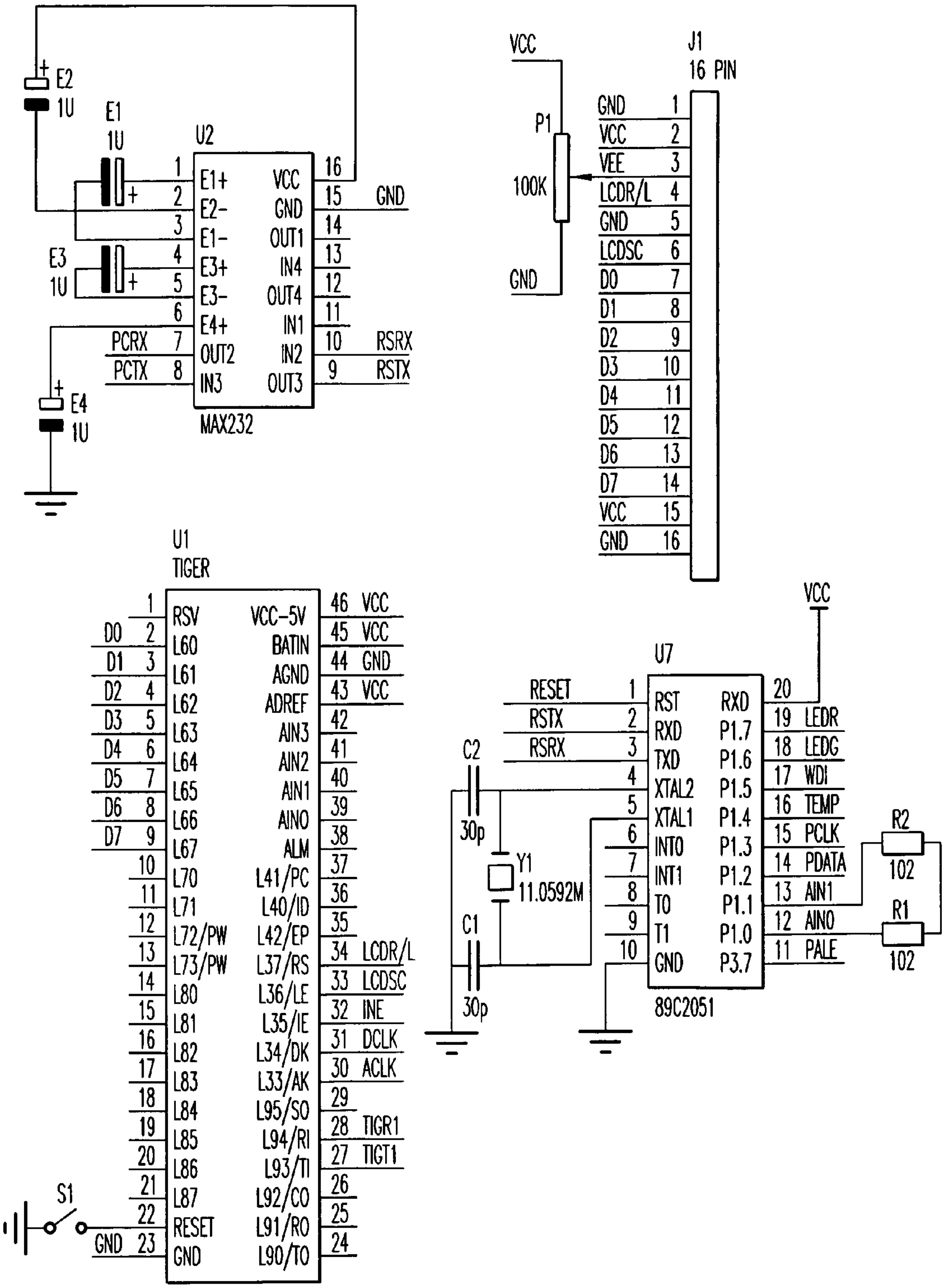
Figure 7C:
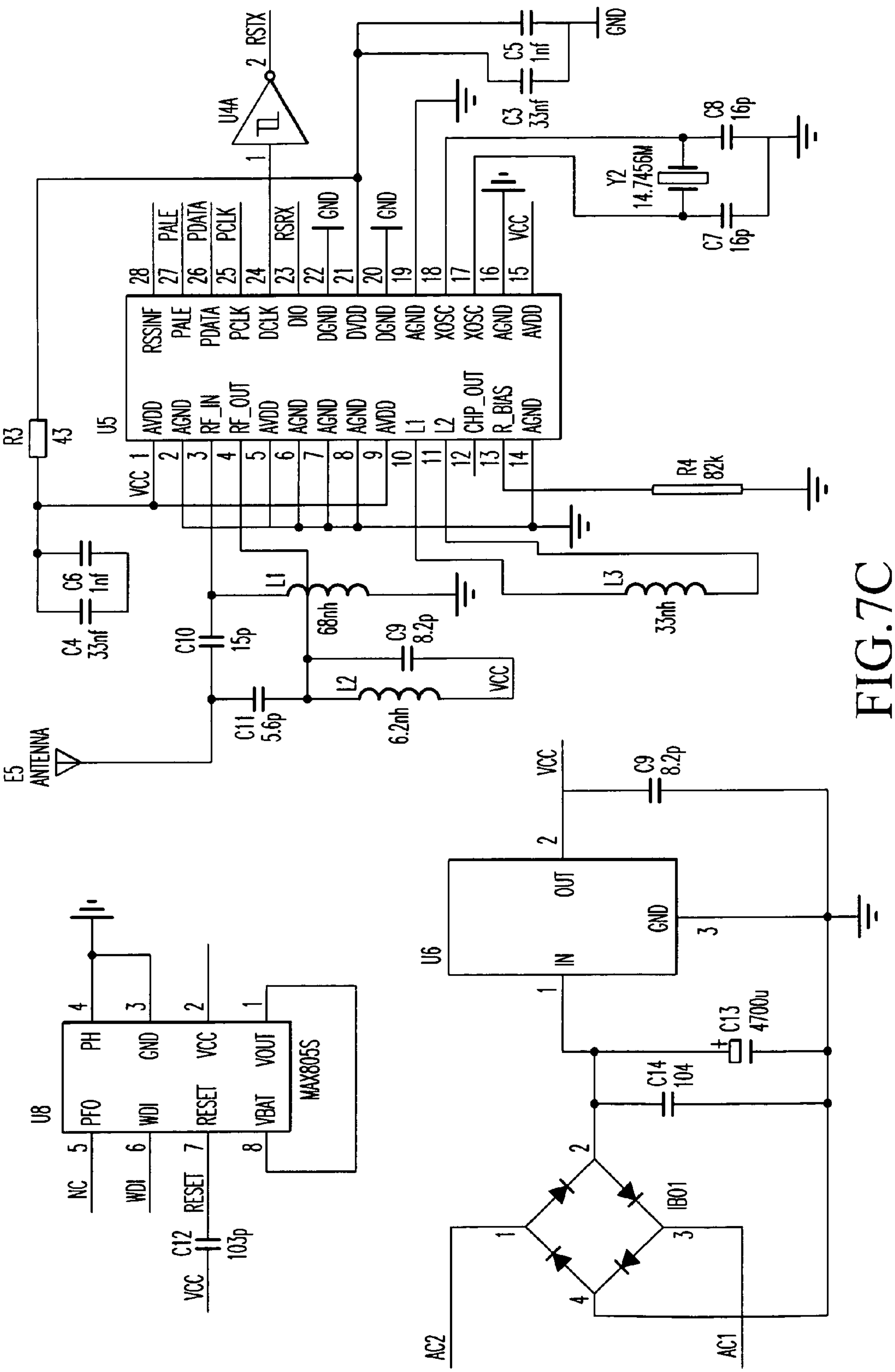

FIG. 7 is a schematic diagram of parts of the monitoring device. U1 is the microprocessor unit 12. This includes a processor such as a BASIC TIGER AXI 8/4 chip set. This chip has two communication ports which supports either RS-232C or RS-485 communication protocol, a keypad I/O port and an LCD port. One of the RS232 ports is used to input the control sequence needed for the flow shown in FIG. 5.

U2 is a chipset such as MAX-232 chip. It converts the signal received from the communication port of U1 into a TTL Signal. U3 is an enhanced programmable logic device chipset. It is used to program the additional external logic devices that are needed for interfacing with the keypad LCD TX/RX module. U4A is a chip set such as 74LS14 or 74LS04 chipset that is used to invert the digital signal. This is utilized since the signal level of the TX/RX module has a reverse polarity to the signal sent by U1. U5 is a chipset such as a CC1000 chip that is used by the TX/RX module for sending and receiving RF signals. U6 is a component such as a 7805 component. It is a regulator to ensure a steady 5V DC to the circuitry. U7 is a micro-controller such as the AMTEL AT89C2051 micro-controller. It controls the TX/RX module. Alternatively, U1 can be used to control the TX/RX module directly. U8 is the watchdog circuit with a MAX805S chipset.

Figure 8:
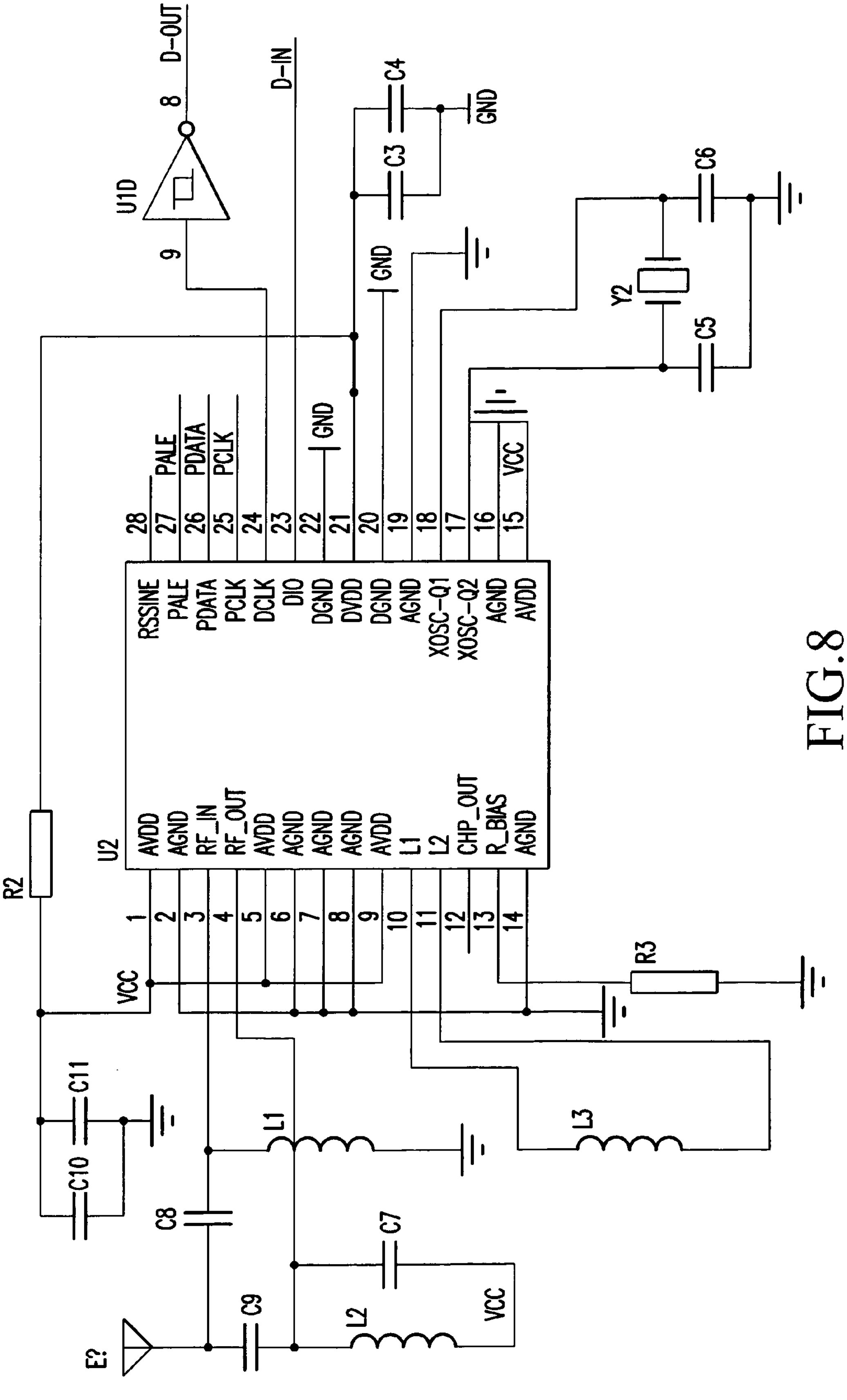
FIG. 8 is a schematic of the transmission/reception module of the measuring device.

FIG. 8 shows the circuitry of the TX/RX module of the measuring device 21. U2 is a chip set such as a CC1000 chip. An antenna E is also seen as being connected to terminals 3 and 4.

Figure 9:
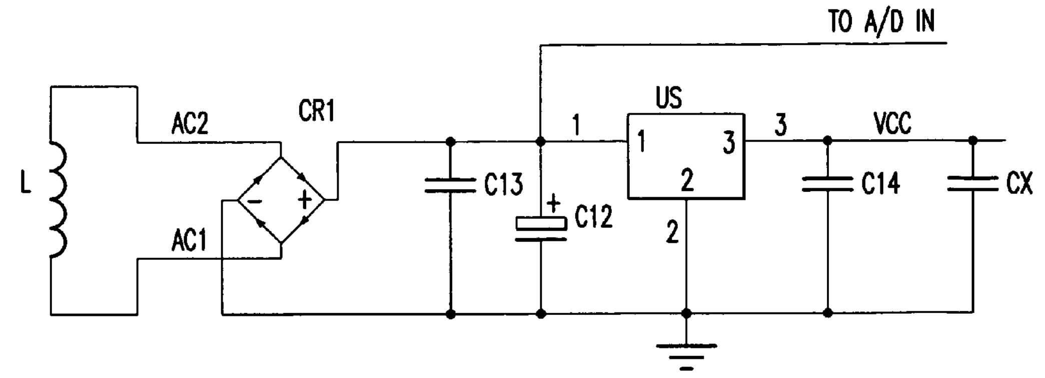
FIG. 9 is a schematic of the power unit of the measuring device.

FIG. 9 shows the circuitry of the power unit 24 of the measuring device. The coil L receives an alternating current from the line conductor to cause an AC current in the power unit. A diode bridge CR1 converts the AC current to a 5 volt DC signal. At point 1, the current value is sent to an A/D chip to convert the analog current signal to a digital signal.

Figure 10:
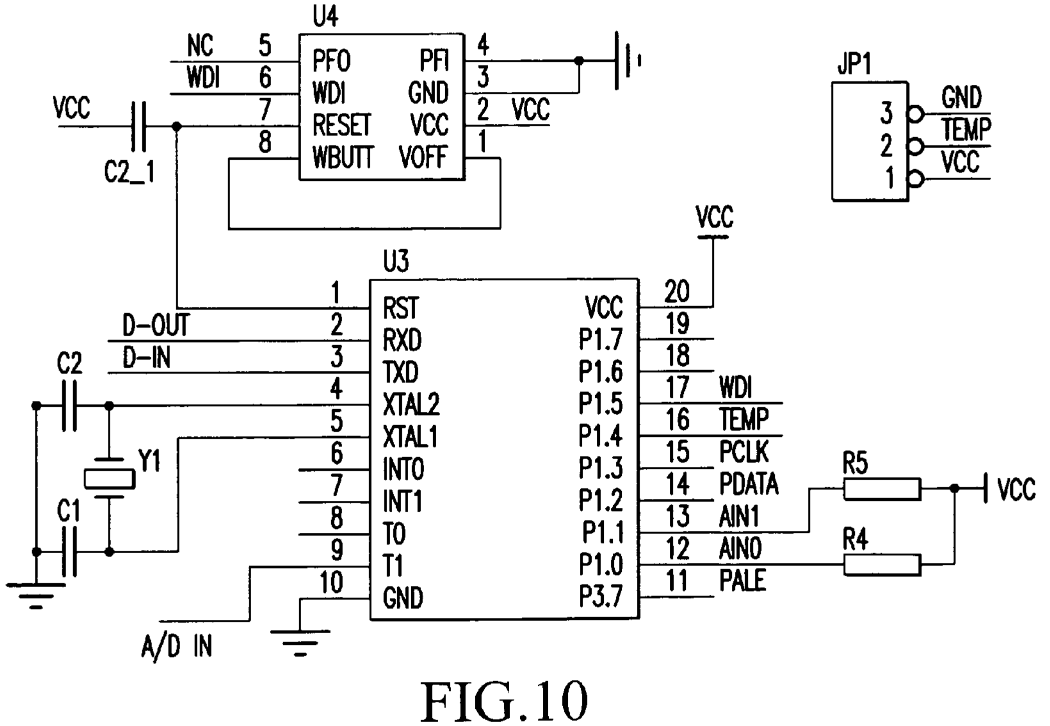
FIG. 10 is a schematic of the temperature sensor of the measuring device.

FIG. 10 shows the circuitry for the temperature sensor of the measuring device. This is a JP1 chipset such as DS18B20 chip that is used to measure the temperature of a coupling point. U4 is a watchdog chip such as MAX805S. U3 is an AT89C2051 chip used as the main computer unit for the device. The digital current value is read via pin TI. Although various exemplary chips have been named, other chips having similar functions can also be used.

In operation, then, when it is desired to obtain information regarding the temperature and current at the various coupling points, the desired measuring device is indicated by an input to the keypad on the monitoring device. The monitoring device transmits a signal interrogating the corresponding measuring device. This is detected by the measuring device so that only the desired device will respond. The data is gathered and transmitted to the monitoring device which outputs the data as well as displays it on the LCD panel. If desired, more than a single measuring unit can be monitored in sequence. An alarm may be triggered if the temperature or current falls outside of operation limits. The remote distance between the measuring devices and the monitoring device is set to about 100 meters. Thus, it is not necessary approach each measuring point as long as the measuring devices are within this distance. Larger or smaller distances can be designed using appropriate adjustments. Once the data is acquired by the monitoring device, it is possible that it can be forwarded through a communication interface by standard communication means such as phone lines, broadband, internet or GSM lines. By using a system of this type, it is not necessary to utilize batteries for the measuring equipment or to provide power. Also, the measuring device is sealed and closed and supported by an insulating material.

The shape of the specific measuring device is determined by the shape of the power line that it surrounds. While the most common shape would be a torroid shape with a circular opening, it would also be possible to have a squared arrangement for a similar shaped conductor.

Additional modifications and variations of the present invention are possible in light of the above teachings. It is therefore to be understood that within the scope of the appending claims, the invention may be practiced otherwise and is specifically described herein.

The invention claimed is:

1. A temperature and current measuring system for detecting insecure coupling points in an electrical generation and distribution system, comprising:

a monitoring device, including a main processing unit that uses a parallel processor, a power supply unit and a transmission/reception module; and at least one measuring device, including a main control unit, a transmission/reception module, a temperature sensor, a current measuring unit and a power unit for measuring temperature and current at coupling points of an electrical distribution network, said temperature sensor being in physical contact with insulation surrounding a junction point;

wherein said monitoring device receives data concerning the parameters from at least one measuring device remotely through radio waves transmitted between a transmission/reception module in each of the monitoring device and each measuring device;

wherein said main processing unit of said monitoring device processes received data from at least one measuring device to derive prognostic information and diagnostic information for a specific coupling point.

2. The system according to claim 1, wherein the coupling points are indoors.

3. The system according to claim 1, wherein the measuring device is usable indoors and outdoors.

4. The system according to claim 1, wherein the monitoring device and measuring devices establish a conjugated pairing of transmission power needed when one or more measuring devices are installed within enclosed areas.

5. The system according to claim 1, wherein the monitoring device uses a parallel processor chipset to compute the anticipated remaining lifespan of a detected insecure coupling point basing on the data received from the respective measuring device.

6. The system according to claim 5, wherein the processor uses Monte Carlo Simulation to derive the lifespan of the detected insecure coupling point.

7. The system according to claim 5, wherein the processor uses a 5-step Monte Carlo Simulation process to derive the lifespan of the detected insecure coupling point.

8. The system according to claim 7, wherein the five steps include:

Step 1: Compute the actual reliabilities for a selected insecure coupling point, R(actual);

Step 2: Generate N independent uniform variates (random numbers) in the interval 0 and 1 and designate them as the required coupling point's reliability R(i), where i=1 to N;

Step 3: Compare each Ri with R(actual) and consider ith part a failure when R(i) is less than or equal to R(actual) and consider ith part a success when R(i) is greater than R(actual);

Step 4: The insecure coupling point's reliability is estimated as:

R(comp) =Number of system successes/Total number of Monte Carlo trials;

Step 5: If R(comp) is greater than R(actual), increase the utilization time in R(actual);

Wherein the entire procedure (Steps 1 to 5) is repeated until R(comp) is equal to or slightly less than R(actual) and the utilization time for deriving R(actual) is the entire lifespan of the selected insecure coupling point.

9. The system according to claim 5, wherein the processor uses captured values of previous insecure couple points within its internal memory for deriving the lifespan of the detected insecure coupling point.

10. The system according to claim 5, wherein the processor issues a fault when it senses a complete loss of signal from said measuring device for that insecure coupling point.

11. The system according to claim 10, wherein the processor uses the detected fault and the data received for power lines of other phrases to issue fault information for a specific coupling point.

12. The system according to claim 5, wherein the processor can forward its prognostic data and fault data to an existing SCADA system.

13. A measuring device for determining temperature and current at a coupling point, comprising:

a transmission/reception module;

a temperature sensor being in physical contact with insulation surrounding a junction point for detecting growing heat of an insecure coupling point of said coupling point;

a power unit, including a core which surrounds a power line with a minimum 10 amp current flow, so as to induce an AC current in said core to provide power to said measuring device, for inductively receiving alternating current from a power line at said coupling point for providing power to said measuring device; and a current measuring unit for detecting current in said power line using inductive coupling;

said transmission/reception module sending data concerning temperature and current by radio waves to a second transmission/reception module in a monitoring device.

14. The measuring device according to claim 13, further comprising:

a single and miniature chipset watch dog unit to reinitialize the control unit should a voltage of the power unit become too low or programming of the control unit fails, or whenever the control unit is not able to reset a timer of the watchdog unit within a set amount of time, an inactive state of the watchdog unit serving as a fault indication for the monitoring device.

15. The system according to claim 13, wherein the core is a cylindrical solid.

16. The system according to claim 13, wherein the core is elongated in length to house a large power unit in order to increase the transmission power for an enclosed area.

17. The system according to claim 13, wherein the core is a split cylindrical solid with a hinge.

18. The system according to claim 13, wherein the control unit receives data on temperature and current data and derives peak-to-peak current, root mean square current and effective other values for the coupling point.

19. The system according to claim 13, wherein the coupling point is indoors.

20. The system according to claim 13, wherein the measuring device is usable indoors and outdoors.

21. The measuring device according to claim 13, wherein the measuring device uses miniature chipset-electronics for size and space reduction in order to be enclosed within the core.

22. The measuring device according to claim 13, wherein the measuring device uses circuitry layout that wraps around within the material surrounding the core.

23. The system according to claim 13, wherein the core includes a coil which is enclosed in an insulating, fireproof, non-electrically shielded and weatherproof material.

24. The system according to claim 23, wherein a radio antenna for said transmission/reception module in the control unit is included in the material surrounding the coil.

25. The system according to claim 13, wherein the core takes the shape of the power line that it surrounds for maximizing the magnetic flux harnessing for its power unit.

26. The measuring device according to claim 25, wherein the core is pressed firmly against the power line that it surrounds.

27. The measuring device according to claim 26, wherein the measuring device is mounted on a power line installed vertically.

28. A system for measuring temperature and current at a coupling point of an electrical distribution network, comprising:

a monitoring device having a processing unit including a parallel processor with a display and keypad, a transmission/reception module that establishes a conjugated pairing of transmission power to the monitoring device and a power supply unit;

a plurality of measuring devices, each including a control unit, a transmission/reception module, a temperature sensor being in physical contact with insulation surrounding the junction point for measuring a growing heat at the coupling point, a power unit, including a core which surrounds a power line with a minimum of 10 amp current flow so as to induce an AC current in said core to provide power to said measuring device, for inductively receiving current from a power line at said coupling point, and a current measuring unit for detecting current in said power line;

said monitoring device receiving temperature and current data about said coupling point from a corresponding measuring device by connecting said transmission/reception module of the monitoring device with said transmission/reception module of said measuring device using radio waves;

wherein, when data is desired from a coupling point, the measuring device is identified by the keypad and the transmission/reception module of the monitoring device sends a request to the transmission/reception module of the identified measuring device, temperature and current data is retrieved and transmitted back to the monitoring device;

wherein the processing unit of the monitoring unit processes received data from at least one measuring device to derive prognostic information and diagnostic information for a specific coupling point.

29. The system of claim 28, wherein each of the monitoring and measuring devices include a watchdog circuit, the inactive state of the watchdog unit serves as a fault indication for the monitoring device.

30. The system according to claim 28, wherein the core is a cylindrical solid.

31. The system according to claim 28, wherein the core is elongated in length to house a large power unit in order to increase the transmission power for an enclosed area.

32. The system according to claim 28, wherein the core is a split cylindrical core with a hinge.

33. The system according to claim 28, wherein the core takes the shape of the power line that it surrounds for maximizing the harnessing of magnetic flux by the power unit.

34. The system according to claim 28, wherein the coupling point is indoors.

35. The system according to claim 28, wherein the measuring device is usable indoors and outdoors.

36. The system according to claim 28, wherein the core includes a coil which is enclosed in an insulating, fireproof, non-electrically shielded and weatherproof material.

37. The system according to claim 36, wherein a radio antenna for said transmission/reception module in the control unit is included in the material surrounding the coil.

* * * * *